US009442263B1

(12) United States Patent
Cheatle

(10) Patent No.: US 9,442,263 B1
(45) Date of Patent: Sep. 13, 2016

(54) CABLE COMPONENTS FORMED WITH A THERMOPLASTIC ELASTOMER AS A NUCLEATING AGENT

(71) Applicant: Superior Essex International LP, Atlanta, GA (US)

(72) Inventor: Wayne Patrick Cheatle, Marietta, GA (US)

(73) Assignee: Superior Essex International LP, Atlanta, GA (US)

( * ) Notice: Subject to any disclaimer, the term of this patent is extended or adjusted under 35 U.S.C. 154(b) by 89 days.

(21) Appl. No.: 14/455,229

(22) Filed: Aug. 8, 2014

(51) Int. Cl.
*G02B 6/44* (2006.01)
*B29D 11/00* (2006.01)
*B29L 11/00* (2006.01)

(52) U.S. Cl.
CPC ......... *G02B 6/443* (2013.01); *B29D 11/00663* (2013.01); *B29L 2011/0075* (2013.01)

(58) Field of Classification Search
USPC .................................................. 385/109, 144
See application file for complete search history.

(56) References Cited

U.S. PATENT DOCUMENTS

| 5,574,816 A | 11/1996 | Yang et al. | |
|---|---|---|---|
| 5,917,977 A * | 6/1999 | Barrett | G02B 6/4416 385/100 |
| 2002/0001440 A1* | 1/2002 | Bourget | G02B 6/443 385/100 |
| 2003/0031862 A1* | 2/2003 | Yamamoto | C09J 7/0275 428/343 |
| 2008/0304798 A1* | 12/2008 | Pavan | C08L 23/0869 385/110 |
| 2009/0010602 A1* | 1/2009 | Nothofer | G02B 6/4402 385/109 |
| 2015/0234143 A1* | 8/2015 | Smith | G02B 6/4494 702/2 |

OTHER PUBLICATIONS

Abreu, F.O.M.S., Forte, M.M.C., Liberman, S.A.; "SBS and SEBS Block Copolymers as Impact Modifiers for Polypropylene Compounds"; Journal of Applied Polymer Sciences, vol. 95, 254-263 (2005).

* cited by examiner

*Primary Examiner* — Eric Wong

(57) ABSTRACT

Components for incorporation into cable, such as communication cables, are described. At least one cable component, such as an optical fiber buffer tube, may be formed from a polymeric resin that has been nucleated or otherwise combined with a thermoplastic elastomer. The cable component may then be incorporated into a cable that includes at least one transmission element.

21 Claims, 7 Drawing Sheets

CABLE COMPONENTS FORMED WITH A THERMOPLASTIC ELASTOMER AS A NUCLEATING AGENT

TECHNICAL FIELD

Embodiments of the disclosure relate generally to components that may be incorporated into cables and, more particularly, to communication cable components formed from polymeric materials nucleated with one or more thermoplastic elastomers.

BACKGROUND

A wide variety of different types of cables are utilized to transmit signals. For example, communication cables, such as twisted pair and optical fiber cables, are utilized to transmit data signals. Many cables incorporate components that are formed from polymeric materials. For example, optical fiber cables often incorporate polymeric buffer tubes, microtubes, core inserts, etc. As another example, twisted pair cables may incorporate polymeric separators or fillers. Other cable components, such as core wraps, can also be formed from polymeric materials.

It is often desirable for certain types of polymeric cable components (e.g., buffer tubes, etc.) to be formed from materials that have a relatively high Young's modulus. A material with a high Young's modulus will generally have a relatively high tensile strength and compressive resistance capability, thereby helping to protect other cable components (e.g., optical fibers, etc.) in the event a cable is twisted, stretched, or compressed. Additionally, it is often desirable to utilize materials that have a relatively low thermal expansion coefficient, thereby limiting shrinkage or expansion caused by temperature changes that can lead to damage of other cable components.

Traditionally, prior art polymeric cable components have been made from materials such as polybutylene terephthalate ("PBT"), polycarbonate ("PC"), a layered combination of PBT and PC, or a polyamide such as Nylon 12. Although each of these materials has a relatively high Young's modulus and a relatively low thermal expansion coefficient, these materials are often more costly, less flexible, more moisture sensitive, and more difficult to process than other polymeric materials, such as polypropylene ("PP"), polyethylene ("PE"), and co-polymers thereof.

More recently, cable components have been formed from PP-PE copolymers that have been nucleated with talc, clay, silica, or another inorganic material as a nucleating agent. The nucleation of the copolymers provides improved compression-tension resistance and shrinkage performance over non-nucleated materials, thereby allowing the PP-PE copolymers to be used instead of PBT and similar more costly materials. However, there is an opportunity for improved polymeric materials that provide relatively greater mechanical and temperature performance relative to materials nucleated with talc or a similar inorganic material. In particular, there is an opportunity to form improved cable components constructed from one or more polymeric materials that include one or more thermoplastic elastomers as nucleating agents and/or impact modifiers.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Figure 1:
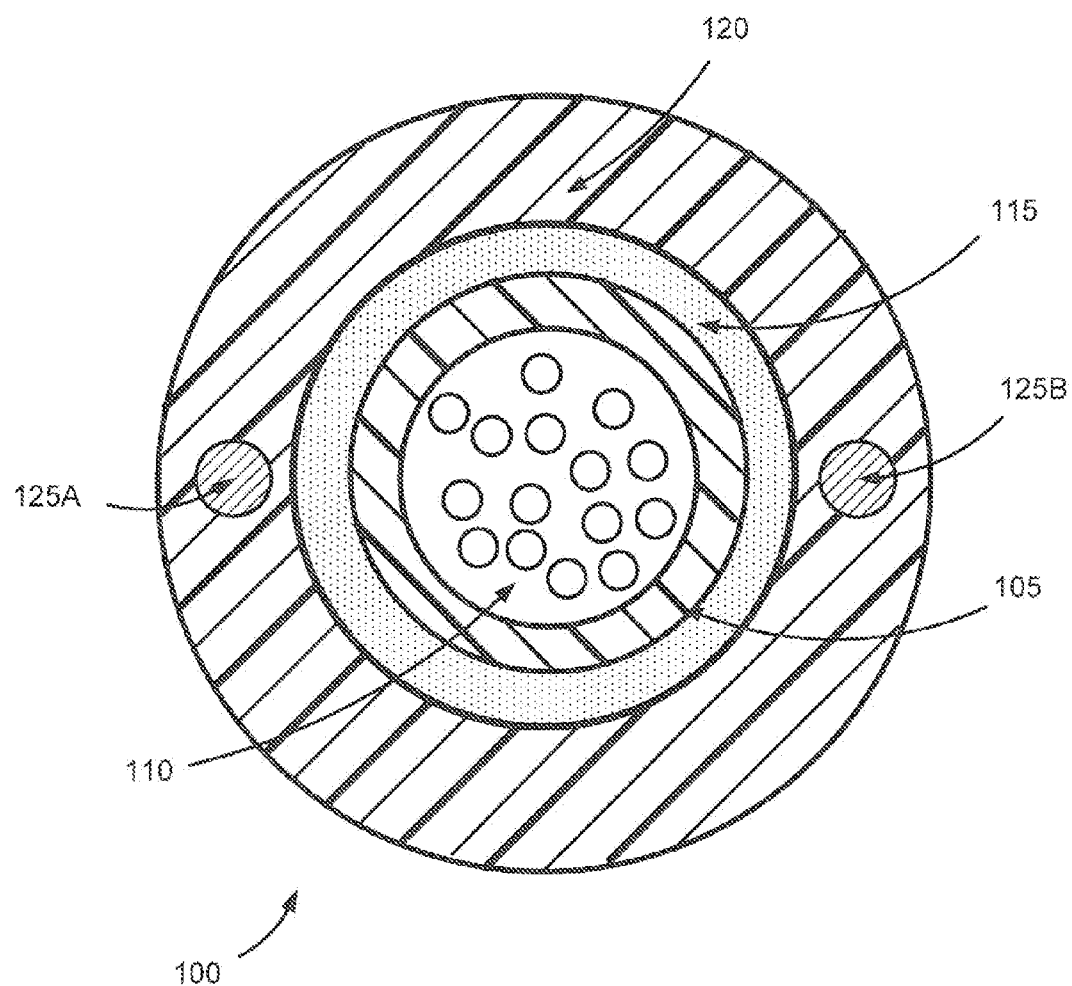
FIG. 1 is a cross-sectional view of an example cable incorporating a buffer tube formed from a polymeric material nucleated with a thermoplastic elastomer, according to an illustrative embodiment of the disclosure.

Various embodiments of the present disclosure are directed to cable components formed from polymeric materials that include one or more thermoplastic elastomers as nucleating agents and/or impact modifiers, as well as cables that incorporate such components. In one example embodiment, a cable may include at least one transmission element or transmission media (e.g., one or more optical fibers, one or more twisted pairs of conductors, etc.) and at least one component formed from a polymeric resin combined with a thermoplastic elastomer ("TPE") that functions as a nucleating agent and/or an impact modifier. For example, a polypropylene homopolymer or a polypropylene copolymer (e.g., a polypropylene copolymer that includes ethylene, etc.) may be combined with one or more TPEs, such as styrene-butadiene-styrene ("SBS") or styrene-ethylene-butene-styrene ("SEBS"). One or more suitable cable components may then be formed from the combination.

As set forth in greater detail below with reference to FIGS. 1-5, a wide variety of different types of cable components may be formed from polymeric materials that have been combined with one or more thermoplastic elastomers. A few non-limiting examples of components that may be formed include optical fiber tight buffers, optical fiber buffer tubes, microtubes, twisted pair separators, cable wraps, inner and/or outer cable jackets, etc. Additionally, these components may be utilized in a wide variety of different types of cables including, but not limited to, optical fiber cables, twisted pair cables, hybrid or composite cables (e.g., cables including a combination of conductors and optical fibers), other communication cables, plenum cables, riser cables, outside plant cables, etc.

As a result of combining a polymeric resin with one or more TPEs, the Young's modulus, tensile strength, elasticity, and/or toughness of the polymeric resin may be enhanced. The addition of one or more TPEs to a polymeric resin as a nucleating agent may also raise the crystallization onset temperature of the polymeric resin. A TPE typically includes a two phase structure having a continuous phase that exhibits an elastic behavior and a dispersed phase that provides physical cross-linking. In certain embodiments, a TPE may include a combination of relatively hard segments or phases and relatively elastic or rubbery segments or phases. When combined with a polymeric resin, the rubbery segments may blend with the polymeric resin and ultimately enhance the tensile strength, elasticity, and/or toughness of the polymeric resin. In other words, the rubbery segments may enhance the durability of the polymeric resin, thereby permitting the polymeric resin to be more energy absorbent and less brittle. The rubbery segments may also enhance the polymeric resin's ability to absorb cracks and/or limit the ability of cracks to propagate through a cable component.

The hard segments may be formed of relatively insoluble materials, such as a styrene block, that do not mix or blend well with the polymeric resin. As a result, the hard segments or cross-linking segments of a TPE may function as a nucleating agent when combined with the polymeric resin. In other words, the hard segments may promote nucleation, thereby raising or increasing the crystallization onset temperature of the polymeric resin. A polymeric resin that has been blended and/or nucleated with one or more TPEs may exhibit improved temperature performance relative to both unmodified polymeric resins and polymeric resins nucleated with conventional inorganic materials (e.g., talc, clays, silica, etc). For example, the polymeric resin and cable components formed therefrom may have a relatively higher maximum operating temperature. In certain embodiments, a polymeric resin combined with a TPE may also have enhanced low temperature performance. For example, cracking and/or brittleness may be reduced at low temperatures.

Certain example embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIGS. 1-5 illustrate example cable constructions in which one or more cable components may be formed from a polymeric resin that has been combined with one or more TPEs. The described cables are provided by way of non-limiting example only, and it will he appreciated that a wide variety of other suitable cable components may be formed in addition to those described. Further, a wide variety of other cable constructions, such as composite or hybrid cables, may incorporate components formed from a polymeric resin combined with one or more TPEs.

Turning now to FIG. 1, a cross-sectional view of an example optical fiber cable 100 is illustrated. The illustrated cable 100 may have a single buffer tube 105, and any number of optical fibers 110 may be disposed within the buffer tube 105. In certain embodiments, a water blocking layer 115 and/or a strength layer may be formed around the buffer tube 105. An outer jacket 120 may then be formed around the internal components of the cable 100. As desired, other cable designs, such as the cable illustrated in FIG. 2, may include a plurality of buffer tubes as well as any number of other cable components.

The buffer tube 105 may be situated within a cable core defined by the outer jacket 120, and the buffer tube 105 may be configured to contain or house optical fibers, such as the illustrated optical fibers 110. Additionally, in certain embodiments, the buffer tube may be formed from one or more polymeric materials that have been combined with one or more TPEs. In other words, the buffer tube 105 may be a cable component formed from a polymeric resin that has been combined and/or nucleated with one or more TPEs. As explained in greater detail below, various polymeric resins and TPEs may be combined prior to formation of the buffer tube 105. Additionally, the buffer tube 105 may be formed as either a single layer or a multiple layer buffer tube. In the event that multiple layers are utilized, the layers may all be formed from the same material(s) or, alternatively, at least two layers may be formed from different materials or combinations of materials. For example, at least two layers may be formed from different polymeric resins. As another example, a flame retarding or other suitable additive may be incorporated into a first layer but not into a second layer. Further, the buffer tube 105 may have any suitable inner and/or outer diameters as desired in various applications.

Any number of optical fibers, other transmission elements, and/or other components may be positioned within the buffer tube 105. In certain embodiments, optical fibers may be loosely positioned in a tube, wrapped or bundled together, or provided in one or more ribbons. FIG. 1 illustrates loose optical fibers 110 positioned in the buffer tube 105. In certain embodiments, water-blocking material (e.g., a water blocking gel, grease, etc.) may also be provided within the buffer tube 105. Alternatively, a buffer tube may be filled with a gas, such as air, powder, a moisture absorbing material, a water-swellable substance, dry filling compound, or foam material, for example in interstitial spaces between the optical fibers 110.

Each optical fiber 110 utilized in the cable 100 may be a single mode fiber, multi-mode fiber, multi-core fiber, or some other optical waveguide that carries data optically. Additionally, each optical fiber may be configured to carry data at any desired wavelength (e.g., 1310 nm, 1550 nm, etc.) and/or at any desired transmission rate or data rate. The optical fibers may also include any suitable composition and/or may be formed from a wide variety of suitable materials capable of forming an optical transmission media, such as glass, a glassy substance, a silica material, a plastic material, or any other suitable material or combination of materials. Each optical fiber may also have any suitable cross-sectional diameter or thickness.

The outer jacket 120 may define an outer periphery of the cable 100. The jacket 120 may enclose the internal components of the cable 100, seal the cable 100 from the environment, and provide strength and structural support. The jacket 120 may be formed from a wide variety of suitable materials, such as a polymeric material, polyvinyl chloride ("PVC"), polyurethane, one or more polymers, a fluoropolymer, polyethylene, medium density polyethylene ("MDPE"), neoprene, cholorosulphonated polyethylene, polyvinylidene fluoride ("PVDF"), polypropylene, modified ethylene-chlorotrifluoroethylene, fluorinated ethylene propylene ("FEP"), ultraviolet resistant PVC, flame retardant PVC, low temperature oil resistant PVC, polyolefin, flame retardant polyurethane, flexible PVC, low smoke zero halogen ("LSZH") material, plastic, rubber, acrylic, or some other appropriate material known in the art, or a combination of suitable materials. In certain embodiments, the jacket 120 may be formed from a polymeric resin that has been combined and/or nucleated with one or more TPEs. As desired, the jacket 120 may also include flame retardant materials, smoke suppressant materials, carbon black or other suitable material for protection against exposure to ultraviolet ("UV") light, and/or other suitable additives. The jacket 120 may include a single layer or, alternatively, multiple layers of material (i.e., multiple layers of the same material, multiple layers of different materials, etc.). As desired, the jacket 120 may be characterized as an outer sheath, a casing, a circumferential cover, or a shell.

The jacket 120 may enclose one or more openings in which other components of the cable 100 are disposed. At least one opening enclosed by the jacket 120 may be referred to as a cable core, and any number of other cable components may be disposed in a cable core. In the cable 100 illustrated in FIG. 1, the buffer tube 105 and water swellable materials 115 are situated within a cable core. A wide variety of other components may be situated within a cable core as desired, such as other transmission media, various separators or dividers, spacers, inner jackets or wraps, etc. Indeed, a wide variety of different cable constructions may be utilized in accordance with various embodiments of the disclosure.

Additionally, the illustrated cable 100 has a circular or approximately circular cross-sectional profile. In other embodiments, other cross-sectional profiles (e.g., an elliptical or oval profile, etc.) and/or dimensions may be utilized as desired. In other words, the jacket 120 may be formed to result in any desired shape. The jacket 120 may also have a wide variety of dimensions, such as any suitable or desirable outer diameter and/or any suitable or desirable wall thickness. Additionally, in certain embodiments, the cable profile may be formed to facilitate a specific function and/or to facilitate installation of the cable. For example, a cable profile may facilitate duct or conduit installation, and the cable 100 may be designed to withstand a specified installation tensile loading and/or other suitable design parameters.

In certain embodiments, at least one "ripcord" may be incorporated into the cable 100, for example, within a cable core. A ripcord may facilitate separating the jacket 120 from other components of the cable 100. In other words, the ripcord may help open the cable 100 for installation or field service. A technician may pull the ripcord during installation in order to access internal components of the cable 100.

Figure 2:
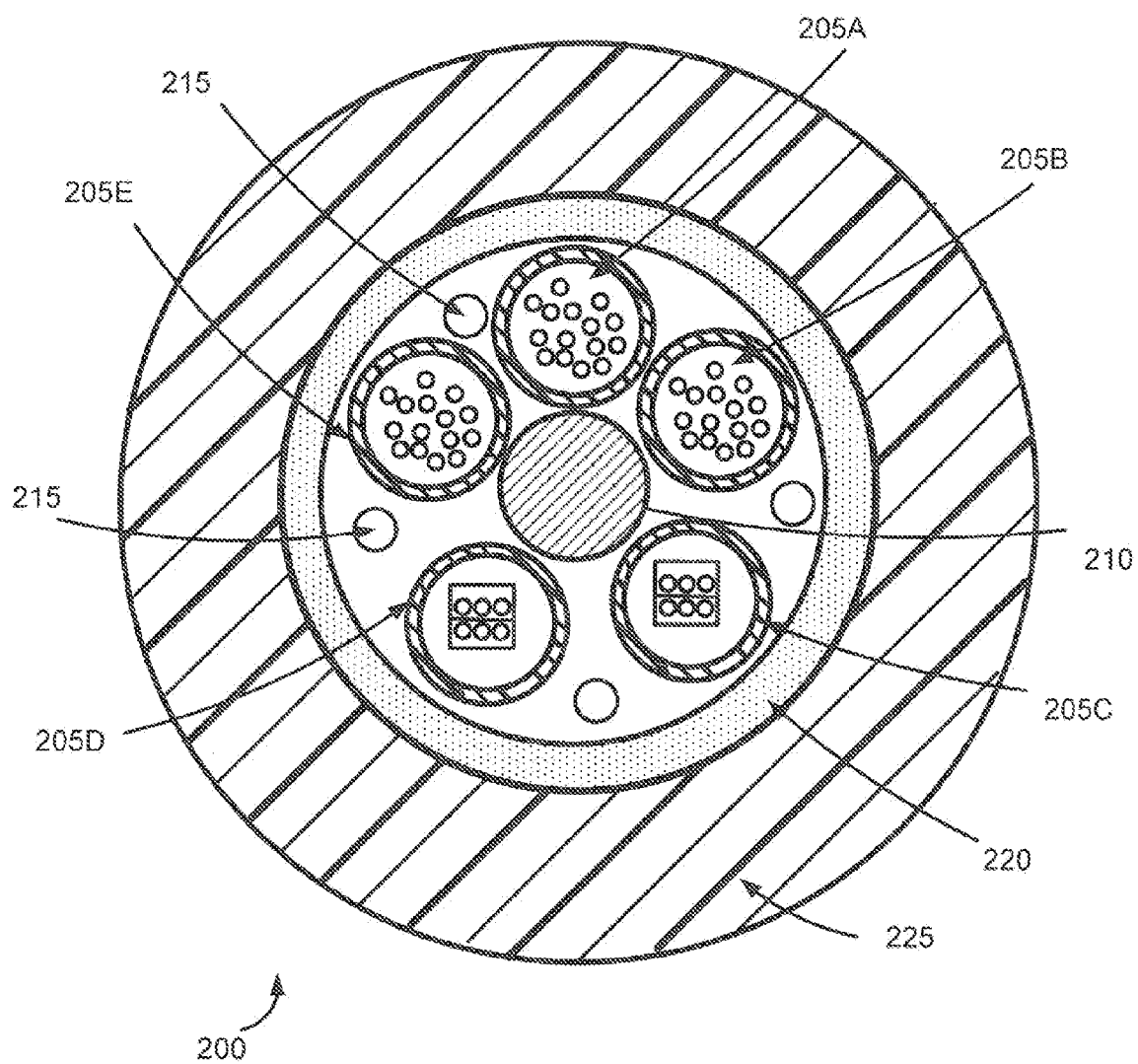
FIG. 2 is a cross-sectional view of an example cable incorporating a plurality of buffer tubes formed from a polymeric material nucleated with a thermoplastic elastomer, according to an illustrative embodiment of the disclosure.
Figure 3:
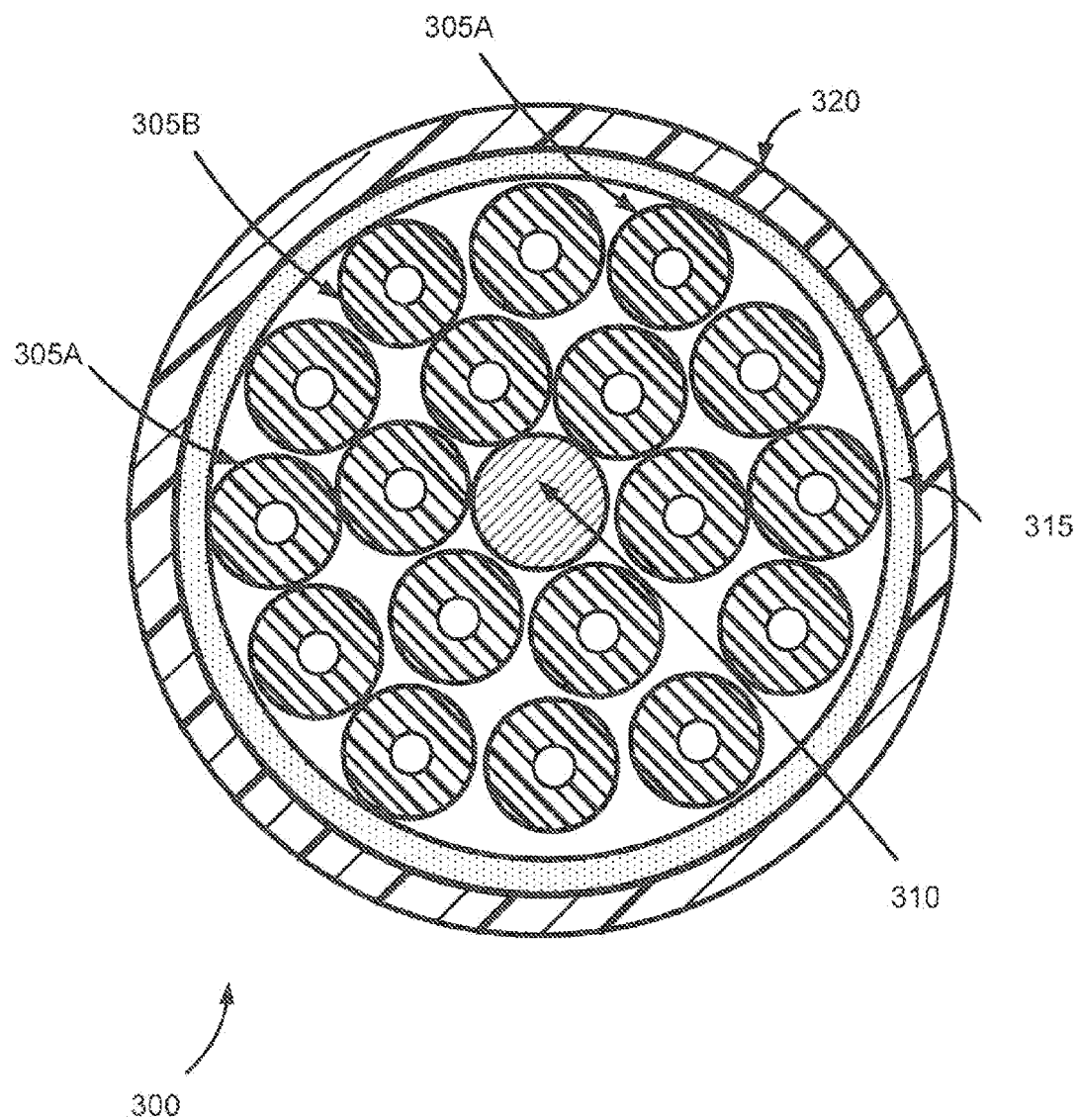
FIG. 3 is a cross-sectional view of an example cable incorporating optical fibers with tight buffers formed from a polymeric material nucleated with a thermoplastic elastomer, according to an illustrative embodiment of the disclosure.

As desired, any number of strength members may be incorporated into the cable 100 at a wide variety of suitable locations. In certain embodiments, one or more strength members 125A, 125B may be embedded in the jacket 120. For example, the jacket 120 may be formed or extruded around one or more strength members 125A, 125B. Embedded strength members 125A, 125B may be located at any desired points within the jacket 120. For example, the strength members 125A, 125B may be located on opposing lateral sides of a longitudinal axis of the cable 100. The strength members 125A, 125B may enhance tensile strength of the cable 100. In other embodiments, one or more strength members may be situated within a cable core, as illustrated in FIGS. 2 and 3. Indeed, a wide variety of strength member configurations may be utilized.

In certain embodiments, the cable 100 may include an armor (not shown) inside or encompassed within the jacket 120. The armor may provide mechanical (e.g., rodent resistance, etc.) and/or electrical protection for transmission media situated within the cable core. The armor may be formed from a wide variety of suitable materials, such as a metal (e.g., steel, a copper alloy, etc.) tape that is formed into a tube, fiberglass, glass, epoxy, and/or appropriate polymeric materials. In certain embodiments, the armor may be formed as an interlocking armor or a corrugated armor. Additionally, an armor may be formed as a single layer armor or alternatively an armor may have multiple layers.

Figure 4:
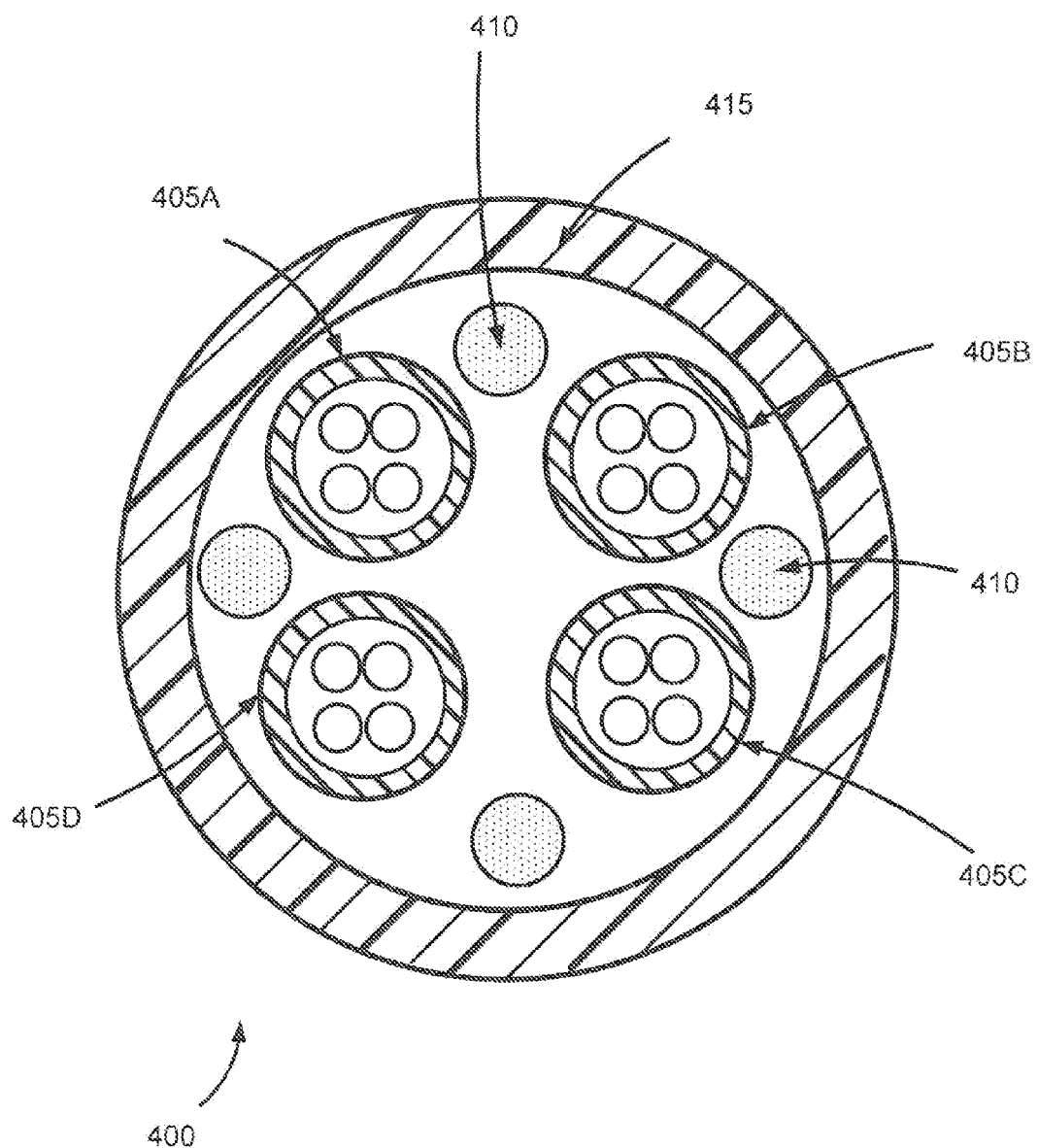
FIG. 4 is a cross-sectional view of an example cable incorporating optical fiber microtubes formed from a polymeric material nucleated with a thermoplastic elastomer, according to an illustrative embodiment of the disclosure.

As desired, the cable 100 may also include water swellable materials or water dams for impeding flow of any water that inadvertently enters the cable 100, for example due to damage of the outer jacket 120. Upon contact with water, water swellable materials may absorb the water and swell, helping to prevent the water from damaging the optical fibers. Impeding the longitudinal flow of water also helps confine any fiber damage to facilitate repair. Accordingly, water dams may help to limit water damage. As shown in FIG. 1, a water swellable tape or wrap 115 may be positioned in a cable core and wrapped around one or more other cable components, such as the buffer tube 110. In other embodiments and as illustrated in FIGS. 2 and 4, one or more water swellable materials (e.g., water swellable yarns, etc.) may be positioned in interstices between core components, such as between one or more buffer tubes or between one or more buffer tubes and a cable jacket. In yet other embodiments, individual core components may be partially or completely wrapped with water swellable materials. As desired in various embodiments, water swellable materials may be provided in a continuous or discontinuous manner along a longitudinal length of the cable 100. Additionally or alternatively, water blocking material (e.g., water blocking dams) may be intermittently incorporated into the cable core. A wide variety of suitable water blocking materials and/or combinations of materials may be utilized as desired.

FIG. 2 is a cross-sectional view of another example cable 200 that may include one or more components formed from a polymeric material combined with a TPE, according to an illustrative embodiment of the disclosure. The cable 200 of FIG. 2 may include certain components that are similar to the cable 100 of FIG. 1; however, the cable 200 of FIG. 2 may include a plurality of buffer tubes 205A-E rather than a single buffer tube. As shown, a plurality of buffer tubes 205A-E may be situated around a central strength member 210. Although five buffer tubes 205A-E are illustrated, any number of buffer tubes can be utilized. In other embodiments, the buffer tubes 205A-E may be situated around a central tube, a central group of twisted pairs, or other central cable component(s)). Additionally, although a single ring or layer of buffer tubes 205A-E is illustrated, in other embodiments, multiple rings or concentric layers of buffer tubes may be utilized. As desired, one or more of the buffer tubes 205A-E may be replaced with other components, such as strength members or spacers. Indeed, a wide variety of suitable buffer tubes arrangements may be utilized.

Each of the buffer tubes 205A-E may be situated within a cable core. The buffer tubes 205A-E may be loosely positioned within the core or, alternatively, stranded or twisted together. Any number of transmission media, such as optical fibers, optical fiber ribbons, and/or twisted pairs, may be situated within one or more of the buffer tubes 205A-E. Each buffer tube may be filled or unfilled as desired. Additionally, in certain embodiments, one or more water blocking components, such as water blocking yarns 215 and/or a water blocking tape 220 or wrap may also be positioned within the cable core. An outer jacket 225 may then be formed around the internal cable components, and the outer jacket 225 may define the cable core (or multiple cores).

Each of the components illustrated in the cable 200 of FIG. 2 may be similar to the components previously described with reference to FIG. 1 above. Additionally, at least one of the components may be formed from and/or incorporate a polymeric material combined with a TPE. For example, one or more of the buffer tubes 205A-E may be formed from a polymeric material combined with a TPE. As another example, the outer jacket 225 (or an internal jacket or wrap layer) may incorporate a polymeric material combined with a TPE. As yet another example, the central strength member 210 may be coated with a polymeric material combined with a TPE.

FIG. 3 is a cross-sectional view of another example cable 300 that may include one or more components formed from a polymeric material combined with a TPE, according to an illustrative embodiment of the disclosure. The cable 300 of FIG. 3 may include certain components that are similar to the cables 100, 200 of FIGS. 1 and 2; however, the cable 300 of FIG. 3 may include a plurality of tight-buffered optical fibers 305A, 305B, 305C, etc. rather than one or more buffer tubes in which optical fibers may be situated. As shown, a plurality of tight-buffered optical fibers, such as fibers 305A, 305B, 305C, may be situated around a central strength member 310. Any number of tight-buffered optical fibers may be incorporated into the cable as desired, and the fibers may be arranged into any number of rings or groupings. As desired in other embodiments, the optical fibers may be situated around a central tube, a central group of twisted pairs, or other central cable component(s)). Additionally, in certain embodiments, one or more of the optical fibers may be replaced with other components, such as strength members, spacers, or buffer tubes. Indeed, a wide variety of suitable tight-buffered optical fiber arrangements may be utilized.

A tight-buffered optical fiber may be formed by applying or forming a cover, jacket, or buffer layer over an individual optical fiber. These buffer layers protect the fiber from physical damage and limit microbending of the fiber. A tight-buffer layer may be formed from any number of suitable materials and/or combinations of materials, such as a wide variety of polymeric materials. In certain embodiments, a tight-buffer layer may be formed from a polymeric resin combined with at least one TPE. Additionally, in certain embodiments, a plurality of tight-buffered fibers may be stranded or twisted together within a cable core. Indeed, a wide variety of different optical fiber arrangements may be utilized as desired in various embodiments.

Additionally, in certain embodiments, one or more water blocking components, such as water blocking yarns and/or a water blocking tape 315 or wrap may also be positioned within the cable core. An outer jacket 320 may then be formed around the internal cable components, and the outer jacket 320 may define the cable core (or multiple cores). Each of the components illustrated in the cable 300 of FIG. 3 may be similar to the components previously described with reference to FIGS. 1 and 2 above. Additionally, at least one of the components (e.g., a tight-buffer layer, a jacket, etc.) may be formed from and/or incorporate a polymeric material combined with a TPE.

FIG. 4 is a cross-sectional view of another example cable 400 that may include one or more components formed from a polymeric material combined with a thermoplastic elastomer, according to illustrative embodiment of the disclosure. The cable 400 of FIG. 4 may include certain components that are similar to the cables 100, 200, 300 of FIGS. 1-3; however, the cable 400 of FIG. 4 may include a plurality of optical fiber microtubes rather than one or more buffer tubes and/or tight-buffered optical fibers. Any number of microtubes, such as the four illustrated microtubes 405A-D, may be situated within a cable core. As desired, the microtubes may be loosely positioned within a cable core; situated around a central strength member, tube, or other component; or stranded or twisted together within a cable core. Additionally, in certain embodiments, one or more of the microtubes may be replaced with other components, such as strength members, spacers, etc. Indeed, a wide variety of suitable microtube arrangements may be utilized.

Each microtube (generally referred to as microtube 405) may house any desired number of optical Fibers, such as two, three, four, eight, twelve, or some other number of optical fibers. The microtube 405 may have a single layer or multi-layer construction, and the microtube 405 may be formed from any suitable material or combination of materials. In certain embodiments, the microtube 405 (or at least one layer of the microtube 405) may be formed from a polymeric resin that has been combined with at least one TPE. Additionally, as desired, a microtube 405 may have an inner diameter that is sized to allow the optical fibers to move relative to one another while preventing the optical fibers from crossing over or overlapping one another. In other words, the microtube 405 may permit the optical fibers to flex or move as the cable is flexed or bent while simultaneously maintaining the position of each optical fiber relative to the other optical fibers. In certain embodiments, an inner diameter of the microtube 405 may be determined based at least in part on the number of optical fibers to be positioned within the microtube 405 and/or the outer diameters of the optical fibers. As a result of using one or more microtubes 405, it may be possible to reduce or minimize the diameter of the cable 400 relative to cables that incorporate loose buffer tubes.

Additionally, in certain embodiments, one or more water blocking components, such as water blocking yarns 410 and/or a water blocking tape or wrap may also be positioned within the cable core. An enter jacket 415 may then be formed around the internal cable components, and the outer jacket 415 may define the cable core (or multiple cores). Each of the components illustrated in the cable 400 of FIG. 4 may be similar to the components previously described with reference to FIGS. 1-3 above. Additionally, at least one of the components (e.g., a microtube, etc.) may be formed from and/or incorporate a polymeric material combined with a TPE.

Figure 5:
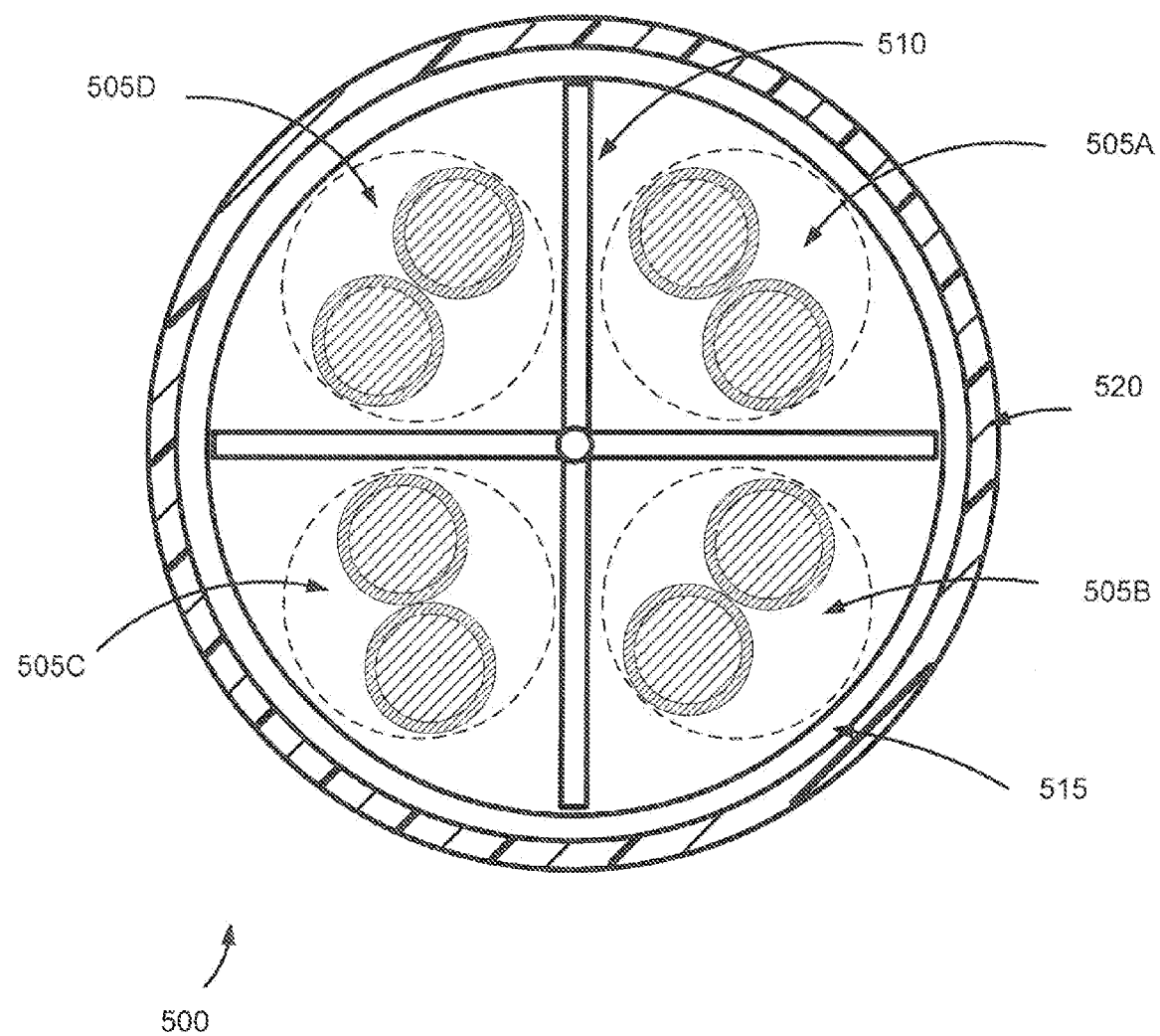
FIG. 5 is a cross-sectional view of an example twisted pair cable incorporating a separator formed from a polymeric material nucleated with a thermoplastic elastomer, according to an illustrative embodiment of the disclosure.

Although FIGS. 1-4 illustrate optical fiber cables, embodiments of the disclosure are equally applicable to cables that incorporate other types of transmission media, such as twisted pairs of individually insulated electrical conductors, coaxial conductors, power conductors, etc. FIG. 5 is a cross-sectional view of an example twisted pair cable 500 that may include one or more components formed from a polymeric material nucleated or otherwise combined with a thermoplastic elastomer, according to an illustrative embodiment of the disclosure.

The cable 500 may include any number of twisted pairs of individually insulated conductors, such as the four twisted pairs 505A-D illustrated in FIG. 5. Each twisted pair (generally referred to as twisted pair 505) can carry data or some other form of information, for example in a range of about one to ten Giga bits per second ("Gbps") or another appropriate frequency, whether faster or slower. A twisted pair 505 may include two electrical conductors, each covered with suitable insulation. As desired, each of the twisted pairs 505A-D may have the same twist lay length or alternatively, at least two of the twisted pairs may include a different twist lay length. For example, different twist lay lengths may function to reduce crosstalk between the twisted pairs 505A-D. The electrical conductors may be formed as solid or stranded conductors from any suitable electrically conductive material or combinations of material, such as copper, aluminum, silver, annealed copper, gold, or a conductive alloy. Additionally, the electrical conductors may have any suitable diameter, gauge, and/or other dimensions.

The insulation may include any suitable dielectric materials and/or combination of materials, such as one or more polymeric materials, one or more polyolefins (e.g., polyethylene, polypropylene, etc.), one or more fluoropolymers (e.g., fluorinated ethylene propylene ("FEP"), etc.), one or more polyesters, polyvinyl chloride ("PVC"), one or more flame retardant olefins, a low smoke zero halogen ("LSZH") material, etc.), etc. Additionally, the insulation may be formed from any number of layers (e.g., single layer, multi-layer, etc.). In the event that multiple layers are used, each of the layers may be formed from the same material(s) or, alternatively, at least two layers may be formed from different materials. In certain embodiments, it may be possible to form at least one layer of the insulation from a polymeric resin combined with at least one TPE. Additionally, as desired, the insulation may be formed to include one or more layers of foamed material. The insulation may also include any number of additives or other materials, such as a flame retardant material and/or a smoke suppressant material.

Additionally, in certain embodiments, a flexible member or separator 510 may be provided between one or more twisted pairs 505A-D, and the separator 510 may assist in maintaining a desired orientation and/or desired positioning of one or more twisted pairs 505A-D. A separator 510 may be formed from a wide variety of suitable materials, such as polypropylene, PVC, polyethylene, FEP, ethylene chlorotrifluoroethlyene ("ECTFE"), or some other suitable polymeric or dielectric material. In certain embodiments, a separator 510 may be formed from a polymeric resin combined with at least one TPE. As desired, a separator 510 may be filled, unfilled, foamed, un-foamed, homogeneous, or inhomogeneous and may or may not include additives (e.g., smoke suppressants, etc.). In certain embodiments, the separator 510 may include electrically conductive material (e.g., electrically conductive patches, embedded electrically conductive material, etc.) that provide shielding for one or more of the twisted pairs 505A-D. Additionally, in various embodiments, a separator 510 may be continuous along a longitudinal length of the cable 500 or discontinuous (i.e., formed with a plurality of discrete or separator sections) along a longitudinal length of the cable 500.

A separator 510 may be formed in accordance with a wide variety of suitable dimensions, shapes, or designs. For example, a rod-shaped separator, a flat tape separator, a flat separator, an X-shaped or cross-shaped separator, a T-shaped separator, a Y-shaped separator, a J-shaped separator, an L-shaped separator, a diamond-shaped separator, a separator having any number of spokes extending from a central point, a separator having walls or channels with varying thicknesses, a separator having T-shaped members extending from a central point or center member, a separator including any number of suitable fins, and/or a wide variety of other shapes may be utilized. In certain embodiments, material may be cast or molded into a desired shape to form a separator 510. In other embodiments, a tape may be formed into a desired shape utilizing a wide variety of folding and/or shaping techniques. For example, a relatively flat tape separator may be formed into an X-shape or cross-shape as a result of being passed through one or more dies.

Twisted pairs 505A-D may be shielded or unshielded as desired in various embodiments. As shown, an overall shield 515 may be formed around all of the twisted pairs 505A-D. In other embodiments, twisted pairs 505A-D may be individually shielded or groups of twisted pairs may be shielded. A shield may be formed as either a continuous shield (e.g., a metallic foil shield, a braided shield, etc.) or as a discontinuous shield that includes patches of electrically conductive material. A discontinuous shield may include electrically conductive patches having any suitable shape(s) and/or dimensions (e.g., lengths, etc.). Additionally, spaces or gaps formed between adjacent patches may have any suitable widths. In certain embodiments, a series of microcuts (e.g., a plurality of gaps less than approximately 0.25 inches, etc.) may be formed between adjacent patches. Additionally, in certain embodiments, an electrically conductive patch may be shorted to itself along a circumferential direction when a shield layer is formed. Shield layers may also be formed from a plurality of overlapping segments (e.g., a fish scale type of arrangement, etc.) in certain embodiments. Indeed, a wide variety of shielding arrangements are available for twisted pair conductors.

In certain embodiments, a shield layer may be formed from both dielectric material and electrically conductive material. For example, electrically conductive patches may be formed on a dielectric substrate. Any number of dielectric layers and/or electrically conductive layers may be utilizes. Additionally, a wide variety of suitable electrically conductive (e.g., copper, aluminum, silver, annealed copper, gold, a conductive alloy, etc.) and/or dielectric materials (e.g., polymeric materials, etc.) may be utilized. In certain embodiments, a substrate layer may be formed at least in part from a polymeric resin that has been combined with at least one TPE, although other suitable constructions may be utilized.

A jacket 520 may be formed around the internal components of the cable 500, and the jacket 520 may define one or more cable cores. The jacket 520 may be similar to the jacket 120 described above with reference to FIG. 1. A wide variety of other materials may be incorporated into the cable 500 as desired. For example, in certain embodiments, a respective dielectric separator or demarcator (not shown) may be positioned between the individual conductive elements or electrical conductors of one or more of the twisted pairs 505A-D. In certain embodiments, a dielectric separator may be woven helically between the individual conductors or conductive elements of a twisted pair 505. In other words, the dielectric separator may be helically twisted with the conductors of the twisted pair 505 along a longitudinal length of the cable 500. In certain embodiments, the dielectric separator may maintain spacing between the individual conductors of the twisted pair 505 and/or maintain the positions of one or both of the individual conductors. For example, the dielectric separator may be formed with a cross-section (e.g., an X-shaped cross-section, an H-shaped cross-section, etc.) that assists in maintaining the position(s) of one or both the individual conductors of the twisted pair 505. In other words, the dielectric separator may reduce or limit the ability of one or both of the individual conductors to shift, slide, or otherwise move in the event that certain forces, such as compressive forces, are exerted on the cable 500. In other embodiments, a dielectric separator may be formed as a relatively simple film layer that is positioned between the individual conductors of a twisted pair 505. A dielectric separator may be formed from a wide variety of suitable dielectric materials, such as veracious polymeric materials. In certain embodiments, a dielectric separator may be formed from a polymeric resin that has been combined with one or more TPEs.

The cables 100, 200, 300, 400, 500 illustrated in FIGS. 1-5 are provided by way of example only to illustrate a few cable constructions in which one or more components may be formed from a polymeric resin combined with at least one TPE. A wide variety of other components may be incorporated into a cable as desired in other embodiments. For example, as set forth above, a cable may include an internal wrap or jacket, a binding layer, a wide variety of suitable transmission media, a wide variety of different types of tubes, spacers, strength members, water blocking materials, water swellable materials, insulating materials, dielectric materials, flame retardants, flame suppressants or extinguishants, gels, fillers, and/or other materials. Additionally, a cable may be designed to satisfy any number of applicable cable standards. These standards may include various operating environment requirements (e.g., temperature requirements), signal performance requirements, burn testing requirements, etc.

In accordance with an aspect of the disclosure and regardless of the type of cable, at least one component of the cable may be formed at least in part from a polymeric resin that has been nucleated or otherwise combined with at least one thermoplastic elastomer ("TPE"). Examples of cable components that may be formed in such a manner include, but are not limited to, buffer tubes, tight-buffer layers, microtubes, separators or fillers, separators positioned between the conductors of twisted pairs, dielectric portions of shielding layers, tapes or wraps, inner jackets, outer jackets, etc. As explained in greater detail below, the addition of a TPE to a polymeric resin may enhance certain properties of the polymeric resin, such as toughness and/or temperature performance.

In certain embodiments, a cable component may be formed completely from a polymeric resin that has been nucleated by or otherwise combined with a TPE. In other embodiments, one or more portions of a cable component may be formed from a polymeric resin that has been combined with a TPE. FIGS. 6A-6D illustrate cross-sectional depictions of example buffer tubes that are formed at least in part from a polymeric resin combined with a TPE. Although example buffer tubes are illustrated in FIGS. 6A-6D, other types of cable components may be formed with similar constructions.

Figure 6A:
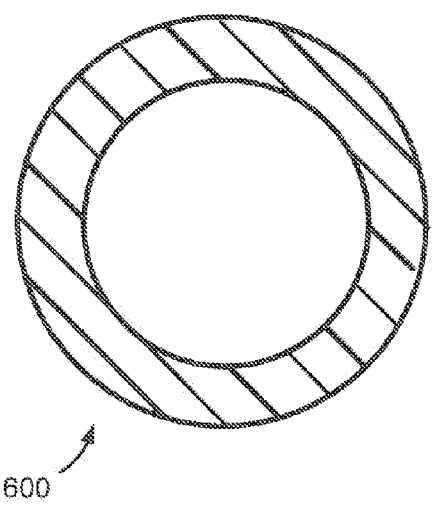
FIGS. 6A-6D are cross-sectional views of example cable components that may be formed at least in part from a polymeric material nucleated with a thermoplastic elastomer, according to illustrative embodiments of the disclosure.
Figure 6B:
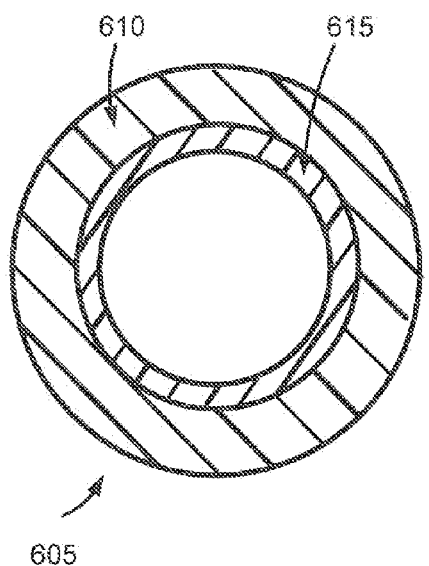

FIG. 6A illustrates an example buffer tube 600 that has been formed from a single material. In other words, the buffer tube 600 of FIG. 6A may be formed completely from a polymeric resin that has been combined with a TPE. FIG. 6B illustrates an example buffer tube 605 that is formed with multiple layers 610, 615. Although two layers are illustrated, any number of layers may be utilized to form the buffer tube 605. Additionally, in certain embodiments, at least two of the layers may be formed from different materials. For example, a first layer may be formed from a polymeric resin combined with a TPE. A second layer may then be formed from a different material or group of materials, such as an unmodified polymeric resin, a polymeric resin, combined with a different type of TPE, a polymeric resin combined with a flame retardant additive, a colored polymeric resin, etc.

Figure 6C:
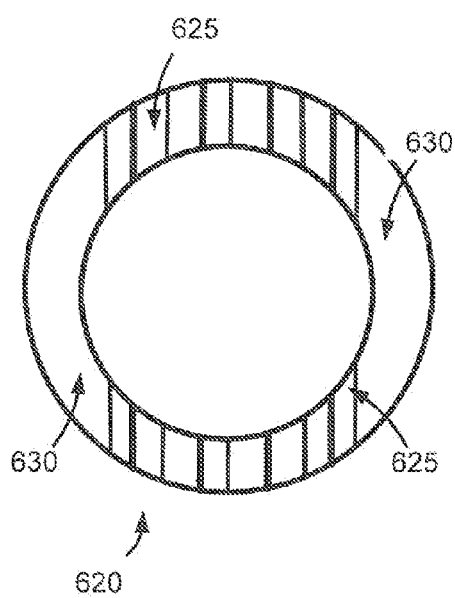

FIG. 6C illustrates an example buffer tube 620 that is formed with multiple segments, such as segments that each occupy a portion of the circumference of the tube 620. Although four segments are illustrated, any number of segments may be utilized as desired in the buffer tube 620. In certain embodiments, a portion of the segments 625 may be formed from a polymeric resin combined with a TPE. Another portion of the segments 630 may be formed from a different material or group of materials, such as an unmodified polymeric resin, a polymeric resin combined with a different type of TPE, a polymeric resin combined with a flame retardant additive, a colored polymeric resin, etc.

Figure 6D:
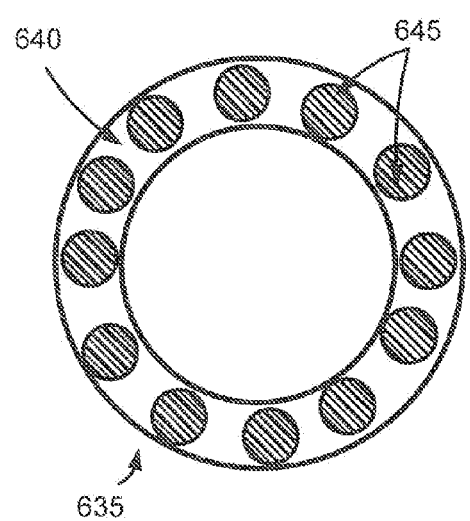

FIG. 6D illustrates an example buffer tube 635 formed with a first base material 640 and strips or segments of a second material 645 that are at least partially embedded within the base material 640. As shown in the cross-section, the strips or segments of the second material 645 are spaced along a circumference of the base material 640; however, in other embodiments, various strips or segments of a second material 645 may be positioned at other areas. Additionally, any number of strips or segments of the second material 645 may be utilized as desired in various embodiments. As desired, each of the strips or segments may extend in a longitudinal direction along at least a portion of the length of the buffer tube 635. For example, a strip may extend along an entire length of the buffer tube 635, along a portion of the length of the buffer tube 635, or in a discontinuous manner at various sections along a length of the buffer tube 635. Additionally, in certain embodiments, the base material 640 and the second material 645 may be formed from different constituent components. For example, the base material 640 may be formed from a polymeric material (or a polymeric material combined with a colorant, flame retardant, or other suitable additives and/or fillers, etc.) while the second material is formed from a polymeric resin combined with a TPE. Additionally, in certain embodiments, at least two of the strips or segments may be formed from different materials. Indeed, a wide variety of suitable constructions may be utilized.

The buffer tubes 600, 605, 620, 635 illustrated in FIGS. 6A-6D are provided by way of example only to illustrate a few example constructions that may incorporate a polymeric resin combined with at least one TPE. A wide variety of other example constructions may be utilized as desired, and the disclosure is not intended to be limited to the illustrated embodiments.

A wide variety of suitable polymeric resins may be utilized as desired in various embodiments. Additionally, a polymeric resin may include any number of suitable polymeric materials. In certain embodiments, the polymeric resin may be formed from and/or include one or more polyolefin materials, such as polypropylene ("PP") and/or polyethylene ("PE"). As one example, the polymeric resin may include a PP homopolymer. Conventional buffer tubes formed from PP are formed from a copolymer of PP and PE, and the PE is required to enhance flexibility at relatively low temperatures; however, the addition of PE degrades toughness at relatively high temperatures. By contrast, as a result of combining a TPE with PE, it may be possible to utilize a PP homopolymer that has both acceptable low temperature and high temperature performance.

As another example, the polymeric resin may include a copolymer of PP and another polymeric material, such as a polymeric material that includes ethylene. For example, the polymeric resin may include a copolymer of PP and PE. In certain embodiments, a PP copolymer may include a relatively lower amount of ethylene than conventional PP/PE copolymers. In other words, the combination of a TPE with the polymeric resin may reduce an amount of ethylene necessary for desired performance characteristics, such as desired low temperature performance characteristics. As desired, an amount of ethylene utilized may be determined based on a desired flex modulus for the polymeric resin and/or components formed from the polymeric resin. For example, a copolymer may be formed that includes approximately 75 percent to approximately 99 percent by weight of PP and approximately one (1) to approximately 25 percent by weight of a material containing ethylene, such as PE.

Polymeric resins formed from PP and/or from PP combined with ethylene (e.g., PP combined with PE) may be less expensive than other polymeric resins traditionally used to form cable components, such as polybutylene terephthalate ("PBT"), polycarbonate ("PC"), and/or polyamides (e.g., Nylon, etc.). The combination of these less expensive polymeric resins with a TPE allows these less expensive resins to be utilized to form cable components. However, although PP and PP/PE resins are primarily discussed herein as polymeric resins, a wide variety of other suitable resins may be utilized. Indeed, a polymeric resin may be formed from any suitable polymeric materials and/or combination of polymeric materials.

Additionally, a wide variety of suitable thermoplastic elastomers "TPEs" or thermoplastic rubbers may be combined with a polymeric resin. Example TPEs include styrenic block copolymers ("TPE-s"), polyolefin blends ("TPE-o"), dynamically vulcanized blends, elastomeric alloys ("TPE-v"), thermoplastic polyurethanes ("TPU"), thermoplastic copolyester, thermoplastic polyamides, polyamide/elastomer block copolymers, and/or other suitable copolymers or polymeric blends that include materials with both thermoplastic and elastomeric properties. In certain embodiments, one or more TPEs containing styrene may be utilized, such as styrene-butadiene-styrene ("SBS") and/or styrene-ethylene-butene-styrene ("SEBS"). As desired, TPEs may include different types of polymeric structures (e.g., block copolymers, etc.). Indeed, a wide variety of different types of TPEs and/or specific materials may be utilized.

According to an aspect of the disclosure, a TPE may include a multi-phase structure, such as a two-phase structure. For example, the TPE may be formed from at least two different substances or materials that have different properties and/or types of structures. In certain embodiments, a TPE may have both a continuous phase and a dispersed phase. For certain TPEs, the continuous phase may function as an elastomeric phase or component, and the dispersed phase may function as a restraining or physical cross-linking phase or component. The continuous phase is typically formed from a rubbery elastomeric component that is relatively soft, such as polybutadiene, polyethylene-co-alkene, polyisobutylene, polyisoprene, polyoxyethylene, polyester, polysiloxane, copolymers of ethane and butane, etc. The dispersed phase is typically formed from a relatively rigid or hard component, such as polystyrene, polymethylmethacrylate, urethane, a fluoropolymer, etc.

TPEs may be formed with a wide variety of suitable of ratios of constituent components or ingredients. In other words, a wide variety of different mix ratios of continuous phase components and dispersed phase components may be utilized. In certain embodiments, the dispersed phase components or relatively hard segments of a TPE may be between approximately 20 and approximately 60 parts-by-weight ("pbw") relative to the continuous or elastomeric phase components. In other words, a ratio of continuous phase components to dispersed phase components may be between approximately 100:20 and approximately 100:60. For example, a TPE may include approximately 20 to approximately 60 pbw of styrenic blocks dispersed in an elastomeric material, such as a butadiene material. Other suitable mixing ratios may be utilized in other embodiments, such as mixing ratios of 100:10, 100:30, 100:40, 100:50, and/or any mixing ratio included in a range between two or more of the described mixing ratios.

When combined with a polymeric resin, the continuous phase or elastomeric segments of a TPE may mix, blend, and/or entangle with the polymeric resin. In certain embodiments, the elastomeric segments and the polymeric resin may be soluble and/or may combine to form a relatively homogenous solution. In certain embodiments, the elastomeric or rubbery segments may also function as a compatabilizer that facilitates and/or assists in the blending of the TPE and the polymeric resin. Additionally, when combined with the polymeric resin, the elastomeric segments of the TPE may enhance the toughness and/or durability of the polymeric resin. For example, the elastomeric segments may enhance the ability of the polymeric resin to absorb imparted energy (e.g. impact stresses, bending stresses, elongation, etc.) and/or function as an impact modifier. As a result, the modified polymeric resin may be relatively less brittle than a conventional polymeric resin. Additionally, the elastomeric segments may enhance the ability of the polymeric resin to absorb cracks. For example, the elastomeric segments may limit and/or reduce the ability of cracks within the polymeric resin to propagate or spread. As a result, the modified polymeric resin may be less likely to deteriorate or break in the event that a crack, imperfection, or flaw occurs.

The dispersed phase or relatively hard components of the TPE may be relatively insoluble with the polymeric resin. In other words, the relatively hard components of the TPE may resist blending or mixing with the polymeric resin. As a result, when the TPE is combined with the polymeric resin, the relatively hard components may promote nucleation. With the relatively hard components serving as a nucleating agent, nuclei for growth of crystals may be promoted within the polymeric resin. In this regard, a relatively high degree of crystallinity and a more uniform crystalline structure may be obtained within the modified polymeric resin. The relatively hard components may additionally increase the Young's modulus, yield, tensile strength, compression resistance, and/or dimensional stability of the polymeric resin when functioning as a nucleating agent.

A wide variety of suitable processes and/or methods may be utilized as desired to combine a TPE (or combination of TPEs) with a polymeric resin. For example, the TPE and polymeric resin may be physically mixed in either a solid (e.g., blending or mixing of pelletized material, etc.) or a liquid state. In certain embodiments, the TPE(s) and the polymeric resin may be combined prior to the formation of one or more components from the modified polymeric resin. For example, a TPE and a polymeric resin may be combined prior to the extrusion of the modified polymeric resin to form a cable component. In other embodiments, the TPE(s) and the polymeric resin may be combined during the formation of one or more cable components. For example, a TPE and a polymeric resin may be combined during an extrusion process. Regardless of the point in time at which the combination occurs, a relatively homogenous dispersion of the TPE and the polymeric resin may be obtained in certain embodiments.

The TPE(s) and the polymeric resin may be combined at any suitable blending or mixing ratio. In certain embodiments, a modified polymeric resin (e.g., the combination of the polymeric resin and one or more TPEs) may include between approximately one percent (1%) and approximately thirty percent (30%) by weight of a TPE (or combination of TPEs). For example, a modified polymeric resin may include between approximately three percent (3%) and approximately ten percent (10%) by weight of a TPE or between approximately five percent (5%) and approximately ten percent (10%) by weight of a TPE. Other suitable blending ratios and/or ranges of blending ratios may be utilized as desired in other embodiments.

Additionally, in certain embodiments, a blending or mixing ratio may be determined such that a modified polymeric resin includes a desired amount or ratio of one or more phases or constituent components of a TPE. For example, a modified polymeric resin may be formed to include desired amounts of a continuous phase material and/or a dispersed phase material. As one example, a modified polymeric resin may be formed to include between approximately 0.03 percent and approximately nine percent (9%) by weight of a dispersed phase material, such as a dispersed phase material that functions as a nucleating agent. As other examples, a modified polymeric resin may be formed to include approximately 0.2%, 0.3%, 0.4%, 0.5%, 0.6%, 0.8%, 1.0%, 2.0%, 3.0%, 4.0%, 5.0%, 6.0%, 7.0%, 8.0%, 9.0%, or any value included in a range between two or more of the above values.

Conventional nucleating agents, such as talc or other inorganic materials, are typically combined with polymers at a rate of between 0.1 percent and 1.0 percent by weight. By contrast, in certain embodiments, the use of a TPE as a nucleating agent permits relatively greater amounts of the TPE to be combined with a polymeric resin. For example, as set forth above, in certain embodiments, a modified polymeric resin may include between approximately 5% and approximately 10% of a TPE by weight. In other embodiments, a modified resin may include up to 30% of a TPE by weight. With the ability to utilize greater amounts of a TPE as a nucleating agent relative to conventional nucleating agents, the blending process for a modified resin and/or the manufacturing process of a cable component may be easier to control and/or a higher degree of tolerance may be permitted.

A wide variety of other components may be blended, mixed, or combined with a polymeric resin and one or more TPEs as desired in various embodiments. These components may include various compatabilizers, cross-linking agents, and/or filler materials. A compatabilizer may promote and/or facilitate mixing of the polymeric resin and a TPE. Examples of suitable compatabilizers include, but are not limited to, SBS, SEBS, maleinated SEBS, etc. A cross-linking agent may promote and/or facilitate chemical cross-linking of a polymeric resin and a TPE. An example of a suitable cross-linking agent is maleinated SEBS; however, other cross-linking agents may be utilized. In certain embodiments, combatabilizers and/or cross-linking agents may be selected based upon the types of polymeric resins and/or TPEs utilized.

Other materials that can be added as suitable fillers include, but are not limited to, one or more flame retardant materials, one or more low smoke zero halogen ("LSZH") materials, one or more smoke suppressants, one or more antioxidants, one or more plasticizers, one or more reinforcing filler materials or strength materials, one or more ultraviolet ("UV") stabilizers, one or more moisture absorbing and/or water absorbing materials (e.g., absorbent powders, supabsorbent materials, etc.), one or more moisture blocking and/or water blocking materials, one or more slip agents, one or more materials that lower or reduce the coefficient of friction of a modified polymeric resin, one or more materials that reduce the coefficient of thermal expansion of a modified polymeric resin, one or more colorants and/or dies, one or more foaming agents, etc. Indeed, a wide variety of suitable formulations and/or recipes may be utilized to blend a polymeric resin or modified polymeric resin that can be utilized to form one or more cable components.

Cable components, such as buffer tubes, formed from a polymeric resin that has been combined with one or more TPEs may exhibit improved performance relative to conventional cable components. In particular, the cable component may exhibit enhanced toughness and/or durability relative to conventional components. The addition of a TPE may enhance the ability of the polymeric resin to absorb imparted energy (e.g. impact stresses, bending stresses, elongation, etc.) and/or function as an impact modifier. As a result, a cable component form from the polymeric resin may be relatively less brittle than a conventional component. Additionally, the ability of the cable component to absorb cracks may be enhanced, as the addition of a TPE may limit the ability of cracks to propagate or spread. As a result, the cable component be less likely to deteriorate or break in the event that a crack, imperfection, or flaw occurs.

The combination of a TPE with a polymeric resin may additionally extend a temperature operating range of a cable component formed from the polymeric resin. For example, an upper limit of the temperature operating range may be extended relative to that of conventional cable components. For example, the addition of a TPE may lower the coefficient of thermal expansion of a polymeric resin. In certain embodiments, a lower limit of the temperature operating range may also be extended relative to that of conventional cable components. For example, cracking and/or brittleness may be reduced at low temperatures. The addition of a TPE as a nucleating agent may also induce faster crystallinity and, as a result, lead to less shrinkage of a formed cable component based on temperature fluctuations.

The addition of a TPE to a polymeric resin may enhance a wide variety of other properties in various embodiments. For example, the addition of a TPE may increase the Young's modulus, yield, tensile strength, compression resistance, and/or dimensional stability of a cable component. Additionally, because it is possible to utilize relatively larger amounts of a TPE as a nucleating agent as compared to conventional nucleators, it may be relatively easier to facilitate a nucleation process. For example, a nucleation process may be subject to a higher degree of tolerance.

Figure 7:
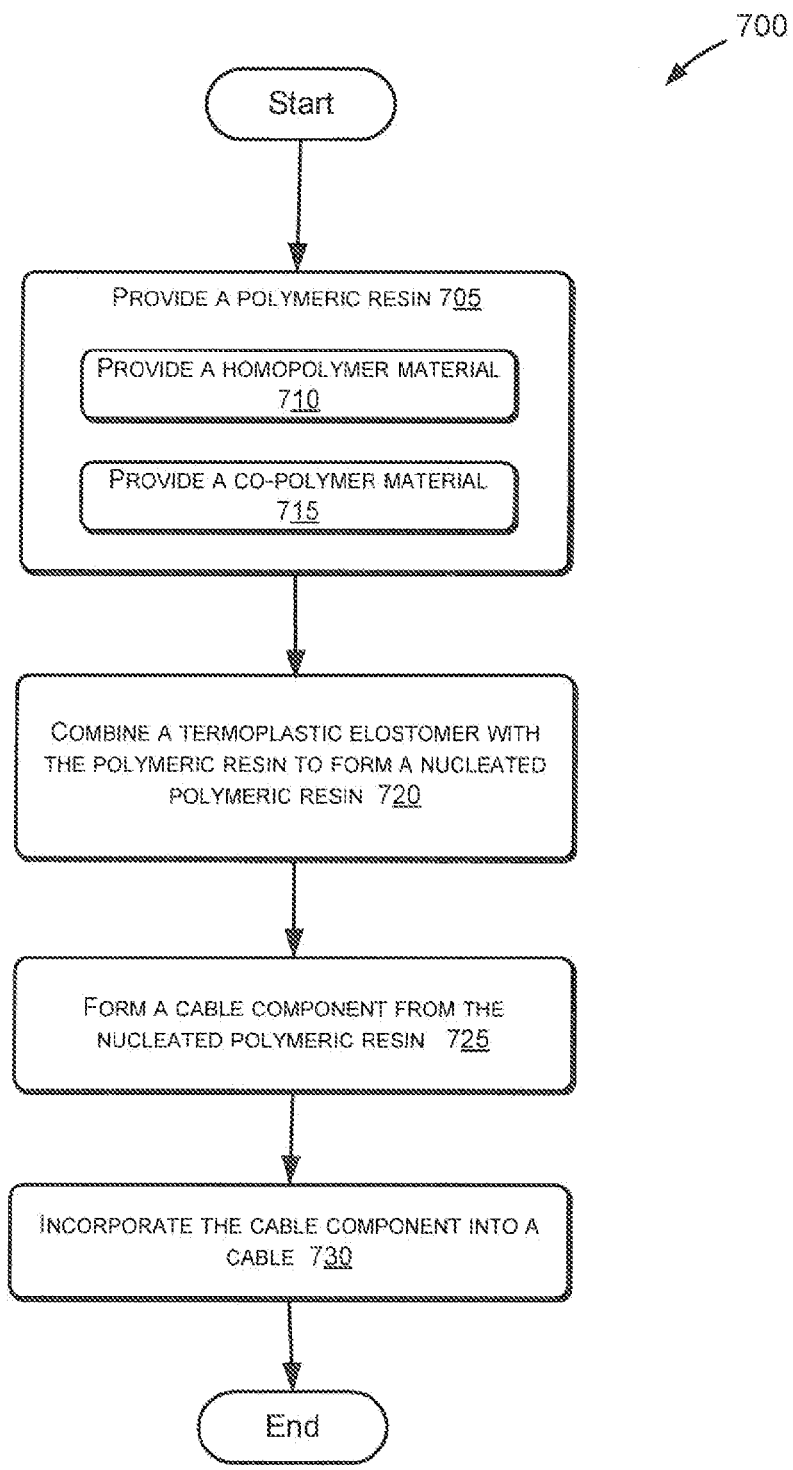
FIG. 7 is a flowchart of an example method for forming a cable component from a polymeric material nucleated with a thermoplastic elastomer, according to an illustrative embodiment of the disclosure.

FIG. 7 is a flowchart of an example method 700 for forming a cable component from a polymeric material nucleated with a thermoplastic elastomer, according to an illustrative embodiment of the disclosure. The method 700 may begin at block 705. At block 705, a polymeric resin or base material may be formulated or otherwise provided. A wide variety of suitable polymeric resins may be provided as desired in various embodiments. For example, at block 710, a polymeric resin formed from a homopolymer, such as a PP homopolymer, may be provided. As another example, at block 715, a polymeric resin formed from a copolymer (e.g., a copolymer of PP and PE, etc.) may be provided. Other suitable polymeric resins may be utilized in other embodiments.

At block 720, at least one TPE may be combined with the polymeric resin via any number of suitable methods and/or techniques, such as physical mixing and/or chemical or reactive mixing. In certain embodiments, a TPE may be combined with the polymeric resin prior to the extrusion of the polymeric resin to form a cable component. In other embodiments, a TPE may be combined with a polymeric resin during the extrusion of a cable component. In yet other embodiments, a portion of a TPE (or a plurality of TPEs)

may be combined with the resin prior to extrusion while another portion of the TPE (or plurality of TPEs) is combined with the resin during extrusion. Additionally, in certain embodiments, a TPE may be added to the polymeric resin at least in part to function as a nucleating agent for the polymeric resin.

At block 725, a cable component may be formed from the modified polymeric resin (e.g., the nucleated polymeric resin, the combination of the polymeric resin and the TPE, etc.). For example, the modified resin may be extruded via any number of suitable extrusion devices (e.g., a single screw extruded, an extrusion die, etc.) in order to form a cable component. Additionally, a wide variety of suitable cable components may be formed from the modified polymeric resin as desired in various embodiments including, but not limited to, buffer tubes, tight-buffer layers, microtubes, separators or fillers, separators positioned between the conductors of twisted pairs, dielectric portions of shielding layers, tapes or wraps, inner jackets, outer jackets, etc.

At block 730, the formed cable component may be incorporated into a cable. In certain embodiments, the cable component may be formed in an offline process prior to the construction of the cable, and the component may subsequently be incorporated into the cable. In other embodiments, the cable component may be formed in an inline process during the construction of the cable. As one non-limiting example, a buffer tube may be extruded around one or more optical fibers, optionally combined with other internal cable components, and then encapsulated within an outer jacket during a cable formation process.

The method 700 may end following block 730. The operations described and shown in the method 700 of FIG. 7 may be carried out or performed in any suitable order as desired in various embodiments. Additionally, in certain embodiments, at least a portion of the operations may be carried out in parallel. Furthermore, in certain embodiments, less than or more than the operations described in FIG. 7 may be performed.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

That which is claimed:

1. A communications cable comprising:
    at least one transmission element; and
    at least one component at least partially formed form a polymeric resin, the polymeric resin comprising:
        a base polymeric material; and
        a nucleating agent comprising a thermoplastic elastomer, the nucleating agent comprising between approximately one percent and approximately thirty percent by weight of the polymeric resin.

2. The communications cable of claim 1, wherein the at least one transmission element comprises at least one optical fiber, and
    wherein the at least one component comprises one of (i) a buffer tube formed around the at least one optical fiber or (ii) a tight buffer formed around the at least one optical fiber.

3. The communications cable of claim 1, wherein the at least one transmission element comprises a plurality of twisted pairs of conductors, and
    wherein the at least one component comprises a separator positioned between at least two of the plurality of twisted pairs of conductors.

4. The communications cable of claim 1, wherein the at least one component comprises a jacket formed around the at least one transmission element.

5. The communications cable of claim 1, wherein the base polymeric material comprises polypropylene.

6. The communications cable of claim 1, wherein the base polymeric material comprises one of (i) a polypropylene homopolymer or (ii) a polypropylene copolymer that comprises ethylene.

7. The communications cable of claim 1, wherein the thermoplastic elastomer comprises one of (i) a styrenic block copolymer, (ii) a polyolefin blend, (iii) an elastomeric alloy, (iv) a thermoplastic polyurethane, (v) a thermoplastic copolyester, or (vi) a thermoplastic polyamide.

8. The communications cable of claim 1, wherein the thermoplastic elastomer comprises one of (i) styrene-butadiene-styrene (SBS) or styrene-ethylene-butene-styrene (SEBS).

9. The communications cable of claim 1, wherein the thermoplastic elastomer comprises a two phase structure, the structure comprising a continuous phase that exhibits elastic behavior and a dispersed phase that provides physical cross-linking.

10. The communications cable of claim 1, wherein the thermoplastic elastomer comprises a first material that contributes to mixing with the base polymeric material and a second material that promotes nucleation of the base polymeric material.

11. The communications cable of claim 1, wherein the polymeric resin further comprises a compatabilizer that promotes mixing of the base polymeric material and the thermoplastic elastomer.

12. The communications cable of claim 1, wherein the polymeric resin further comprises a cross-linking agent that promotes chemical cross-linking of the base polymeric material and the thermoplastic elastomer.

13. The communications cable of claim 1, wherein the polymeric resin comprises between approximately three percent and approximately ten percent by weight of the thermoplastic elastomer as a nucleating agent.

14. The communications cable of claim 1, wherein the polymeric resin comprises between approximately 0.3 percent and approximately 9.0 percent by weight of a dispersed phase component of the thermoplastic elastomer.

15. The communications cable of claim 1, wherein the polymeric resin further comprises at least one of (i) a flame retardant material or (ii) a low smoke zero halogen material.

16. The communications cable of claim 1, wherein the polymeric resin further comprises at least one of (i) a smoke suppressant, (ii) an antioxidant, (iii) a plasticizer, (iv) a reinforcing filler material, (v) an ultraviolet stabilizer, (vi) a moisture absorbing material, (vii) a moisture blocking material, (viii) a slip agent, (ix) a coefficient of friction reducing material, (x) a colorant, or (xi) a foaming agent.

17. An optical fiber cable comprising:
at least one optical fiber; and
a buffer element formed around the at least one optical fiber, the buffer element at least partially formed from a polymeric resin comprising:
a base polymeric material; and
a nucleating agent comprising a thermoplastic elastomer, the nucleating agent comprising between approximately one percent and approximately thirty percent by weight of the polymeric resin.

18. The optical fiber cable of claim 17, wherein the buffer element comprises one of (i) a buffer tube or (ii) a tight buffer.

19. A buffer tube for use in an optical fiber cable, the buffer tube comprising:
a polymeric resin formed into a tube, the polymeric resin comprising a base polymeric material and a nucleating agent comprising a thermoplastic elastomer combined with the base polymeric material, the nucleating agent comprising between approximately one percent and approximately thirty percent by weight of the polymeric resin.

20. A method for forming a component of a communications cable, the method comprising:
providing a polymeric resin comprising at least one polymeric material;
nucleating the polymeric resin by combining a thermoplastic elastomer with the polymeric resin, wherein the thermoplastic elastomer comprises between approximately one percent and approximately thirty percent by weight of the nucleated polymeric resin; and
extruding the nucleated polymeric resin to form the component of the communications cable.

21. The method of claim 20, wherein extruding the nucleated polymeric resin comprises extruding the nucleated polymeric resin to form one of (i) an optical fiber buffer tube or (ii) an optical fiber tight buffer.

* * * * *